April 24, 1962  L. VON REPPERT  3,030,657
DEVICE FOR GRANULATION
Filed July 17, 1959
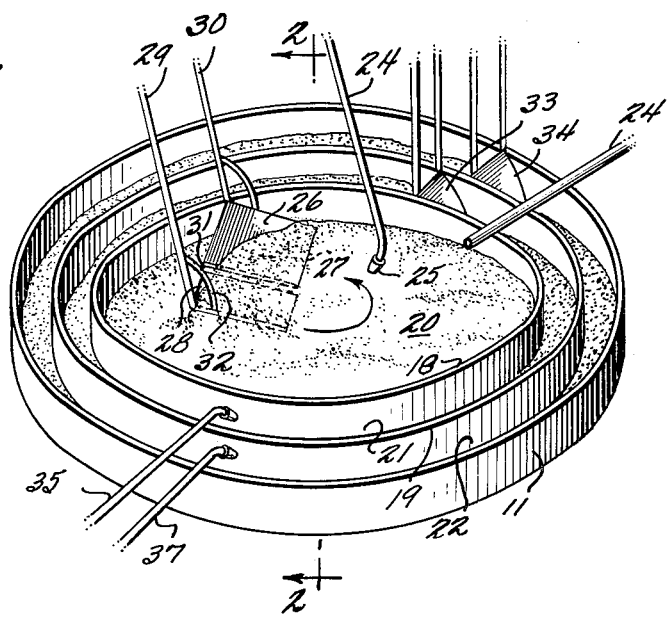
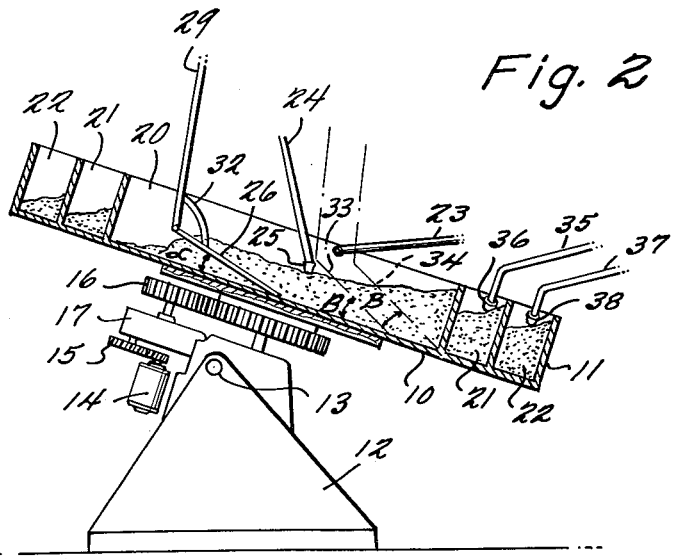
INVENTOR.
LOTHAR VON REPPERT
BY
Irvin S. Thompson
ATTORNEY

United States Patent Office 3,030,657
Patented Apr. 24, 1962

3,030,657
DEVICE FOR GRANULATION
Lothar von Reppert, Wiesbaden, Germany, assignor to Düngemittel Technik A.G., Basel, Switzerland, a corporation of Switzerland
Filed July 17, 1959, Ser. No. 827,965
Claims priority, application Germany July 22, 1958
8 Claims. (Cl. 18—1)

The present invention has for its object a device for the granulation of powdered materials, in particular for the preparation of phosphate fertilizers in a granulated form.

It is known that an increasing amount of effort is being applied to the use of fertilizers in agriculture in a granulated form, on account of the advantages offered by this form. Granulated fertilizers of this nature can be obtained in a number of ways, and one of these consists in treating the powdered material in a rotary granulator of the tray type by the injection of water or acid.

One of the objects of the invention is an improved granulating device which has a good efficiency of production.

A further feature of the present invention is the production of a device which can be adapted to give a large number of treatments in a single operation, and especially to the drying and cooling of the granulated fertilizer.

The accompanying drawings illustrate a device in accordance with the invention.

FIG. 1 is a view of the granulator in perspective.

FIG. 2 is a view in cross-section of the device, taken along the line II—II of FIG. 1.

The device is composed of a rotatable tank with a flat or concave bottom 10 and a peripheral edge 11. This tank is mounted on a support 12 pivotally mounted on the shaft 13, which thus enables the tank to be set for rotation in any desired inclination.

The rotary drive for the tank is provided by a motor 14 and sets of gears 15, 16 and a reduction gear 17.

In the interior of the tank are formed flanges 18, 19 having the same height as the edge 11 of the tank. These flanges form and delimit successive spaces in the tank, namely the central portion 20 and the annular portions 21 and 22, which are arranged concentrically with respect to the said central portion 20.

The powdered material is fed in through a conduit 23. A supply of liquid, water or acid, is admitted through the pipe 24, the free extremity of which is provided with a spraying nozzle 25.

A scraper member 26 is provided in the central part of the tank 20. This scraper member is arranged in such manner that its lower edge 27 is in contact with the bottom 10, and has the same shape as this latter, either straight or curved. This scraper is so arranged as to have an angle of slope $\alpha$ with respect to the bottom 10, this angle of slope being adjustable in accordance with the nature of the material to be treated and the treatment to which the material is to be subjected. This scraper member can be in one or a number of sections. In FIG. 1, it is shown in the form of two elements 26 and 28. It is supported by arms 29 and 30, leaving a free passage on the upper edge 31 of the scraper. The scraper is intended to have an angle of slope $\alpha$ which can be adjusted by means of lateral bars 32, or by any other means.

In the annular spaces 21 and 22 are also provided scrapers 33 and 34. These scrapers are arranged so as to have a variable angle of slope $\beta$.

In the annular space 21, in the lower portion of which the granules collect together, there is mounted a pipe 35 which is coupled to a source (not shown) of hot fluid: hot air or superheated steam. The extremity of this pipe 35 is preferably provided with a nozzle 36 which opens into the mass of granules in movement in the space 21.

A pipe 37 is provided in the same manner in the annular space 22, this pipe 37 being coupled to a source of cold air, which is preferably cooled even below the ambient temperature. The extremity of the pipe 37 is provided with a nozzle 38 opening into the granules in the space 22.

In accordance with a preferred form of embodiment the tank has a diameter of 2 meters (80 inches). The height of the edge 11 and of the flanges 18 and 19 is at least 200 mm. (8 inches), and the distance between each flange is at least 300 mm. (12 inches). The range of adjustment of the angles of slope $\alpha$ and $\beta$ of the scrapers 26, 28, 33 and 34 is from 2° to 45°.

The powdered material, especially in the form of micropulverized natural phosphate, is poured through the conduit 23 into the granulator which has been described above. This phosphate is carried away by the movement of the granulator. It is treated with phosphoric, sulphuric or nitric acid fed through the piping system 24 and the spray nozzle 25.

After having carried out a few revolutions, the material is formed into granules by the acid. It passes over the flange 18 and falls into the space 21. While in this space, the granules of the material are treated with a hot fluid fed in through 35, thus providing a rapid and effective drying process. The material then passes into the space 22 in which it is treated with cooling air fed in through 37.

The granules are dried, cooled and hardened, and then pass over the edge 11 where they are collected ready for use as a fertilizer.

In the granulation device as described above, the scraper enables the speed of rotation to be increased without interfering with the effectiveness of the treatment. This rotation which usually takes place at a speed of 15 r.p.m. in the usual types of granulators can be increased to 30 r.p.m. and even more, thus increasing the rate of production of the granulator by at least 50%.

What I claim is:

1. An apparatus for the granulation of powdered materials into granular particles comprising an inclined rotatable tray having a peripheral wall, a support member for rotatably mounting said tray, means for rotating said tray, and a stationary scraper member having one end mounted above said tray and the other end in operable contact with the bottom of said tray for contacting the material carried on said tray, said scraper member being inclined in angular relationship with respect to the bottom of said tray.

2. An apparatus according to claim 1 in which said tray is pivotally mounted on said support member.

3. An apparatus according to claim 1 in which the bottom of said tray and the end of said scraper member in contact therewith have the same configuration.

4. An apparatus according to claim 1 in which said tray has a plurality of compartments disposed in parallel relationship with respect to the axis of said tray, and each compartment has disposed therein a further scraper member having one end mounted above said tray and the other end contacting the bottom of said tray in inclined and adjustable angular relationship therewith.

5. An apparatus according to claim 1 in which said scraper member is adjustable from 2° to 45° with respect to the bottom of said tray.

6. An apparatus according to claim 1 in which said scraper member is composed of two elements with a free passage disposed therebetween.

7. An apparatus for the granulation of powdered materials into granular particles comprising an inclined rotatable tray having a peripheral wall, a support member for rotatably mounting said tray, means for rotating said tray, and a stationary scraper member having one end mounted above said tray and the other end in operable contact with the bottom of said tray for contacting the material carried on said tray, said scraper member being inclined in angular relationship from 2° to 45° with respect to the bottom of said tray.

8. An apparatus for the granulation of powdered materials into granular particles comprising an inclined circular rotating tray, a plurality of circular flanges mounted on said tray in perpendicular and concentrical relationship to form and delimit successive spaces in said tray, a support member for rotatably and inclinably mounting said tray, means for rotating said tray, at least one stationary scraper positioned in the central portion of said tray having one end disposed above said tray and the other end in operable contact with the bottom of said tray, said scraper being inclined in angular relationship from 2° to 45° with respect to the bottom of said tray, and further scrapers positioned in each successive space of said tray and having one end disposed above said tray and the other end in operable contact with the bottom of said tray, said further scrapers being inclined in angular relationship from 2° to 45° with respect to the bottom of said tray.

References Cited in the file of this patent

UNITED STATES PATENTS

| | | |
|---|---|---|
| 2,411,873 | Firth | Dec. 3, 1946 |
| 2,860,598 | Loesche | Nov. 18, 1958 |
| 2,889,576 | Selig | June 9, 1959 |

FOREIGN PATENTS

| | | |
|---|---|---|
| 1,138,560 | France | Jan. 28, 1955 |
| 915,072 | Germany | July 15, 1954 |